May 11, 1937.　　O. VALASEK　　2,079,883
WEEDLESS GUARD FOR FISH LURES, ETC
Filed March 9, 1934　　2 Sheets-Sheet 1
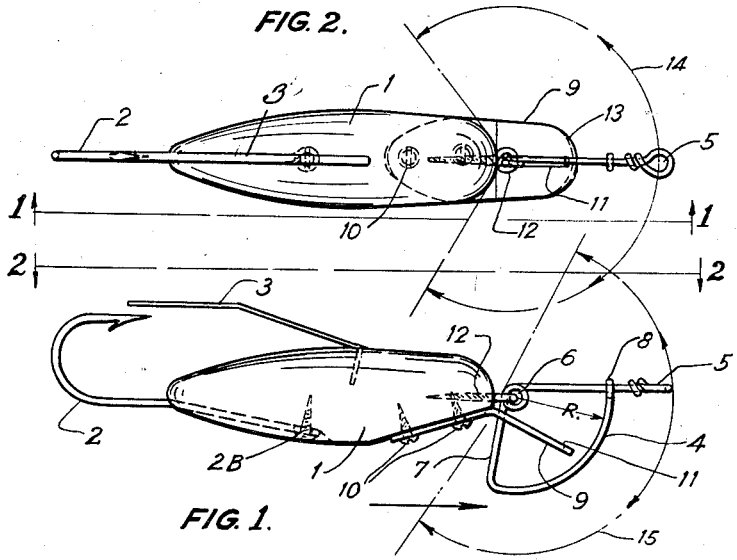
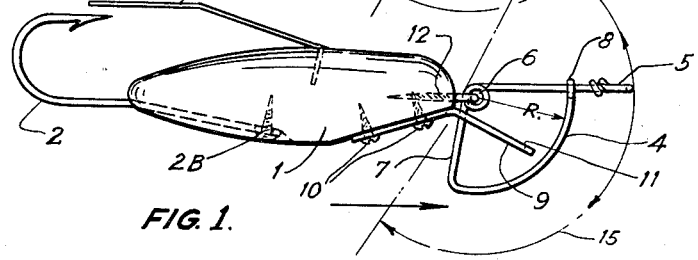
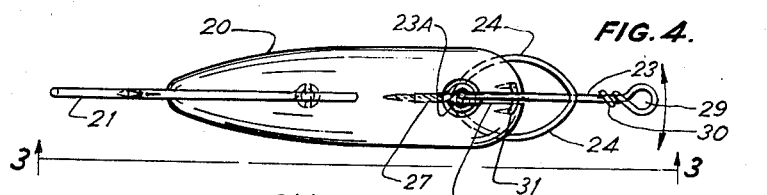
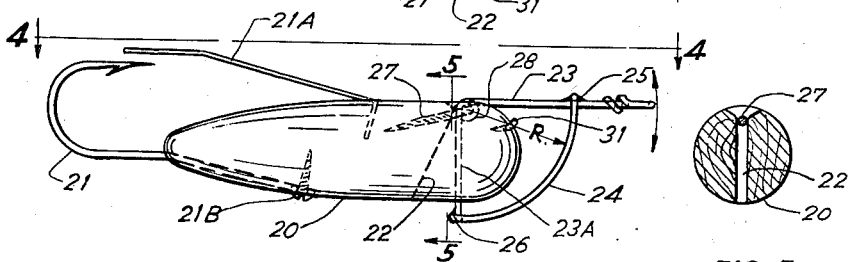
INVENTOR.
OTAKAR VALASEK
BY Cecil Emery &
Eugene V. Taylor.
ATTORNEYS.

May 11, 1937.  O. VALASEK  2,079,883
WEEDLESS GUARD FOR FISH LURES, ETC
Filed March 9, 1934  2 Sheets-Sheet 2
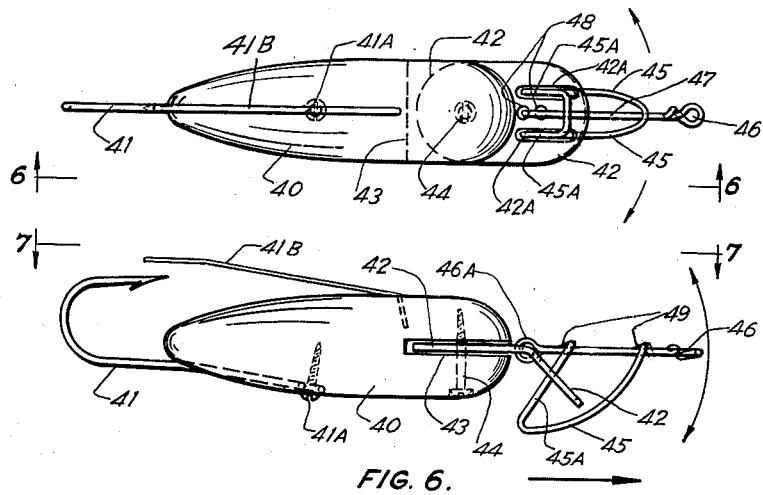
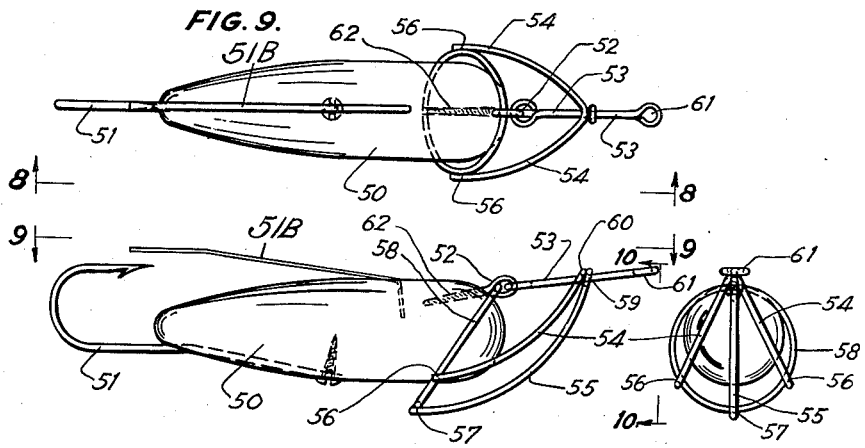
INVENTOR
OTAKAR VALASEK
BY Cecil Emery &
Eugene V. Taylor.
ATTORNEYS Patented May 11, 1937

2,079,883

UNITED STATES PATENT OFFICE 2,079,883

WEEDLESS GUARD FOR FISH LURES, ETC.

Otakar Valasek, Chicago, Ill.

Application March 9, 1934, Serial No. 714,783

9 Claims. (Cl. 43—39)

This invention relates to a novel and improved weedless guard for fish lure devices used for various kinds of fishing purposes, etc.

A primary feature of the present invention resides in the provision of a novel weedless guard for a fish lure or bait, including novel structural characteristics of simple and durable construction, which will be substantially weedless and will eliminate the entangling of weeds, vegetation, stumps, snags, rock or other obstacles in the fishing waters with the fish lure or bait. To this end, I have provided a guard device comprising curved members in sections adapted to be associated with the fish lure or bait so that when the fish lure is drawn through, under or over the weeded patch in the water, the novel curved members will keep the obstacles from being caught in the fish lure or bait.

I further provide that the members of the guard have a large angle of motion relative to the fish lure, which motion further facilitates the drawing or pulling of the fish lure through the weeds or other obstacles in the water.

A further feature of importance and advantage resides in the provision of an aperture in the end of the fish lure device, which aperture or slot serves to retain a member of the novel guard and allow the said guard member to act as a fulcrum of axial movement about which the guard will oscillate or turn,—the limit of axial movement of the guard being only partially dependent upon the aperture in the fish lure device and relative motion between the novel guard and the fish lure device used therewith may also occur in a spherical plane, thereby yielding in various directions to the pull of the lure or of the fish caught on the lure device.

A still further feature of importance lies in the provision of a novel and improved guard adapter disposed in an aperture of the fish lure device; the novel adapter forming a communicating link or member whereto a modified form of the novel guard may be attached. The said adapter is provided with an angular slot to allow the guard a normal motion in a vertical plane and at the same instance the adapter is disposed to move in the horizontal plane with respect thereto. These features provide still further advantages in eliminating the weeds becoming entangled with the fish lure or bait when drawn or pulled through the weeds in the water.

Other and further features of importance and advantage will appear from the following detailed description of the several preferred embodiments of my invention shown in the accompanying drawings, in which:

Figure 1 is a side elevation embodying the salient features of the novel weedless guard for fish lure, the view being taken substantially along the line 1—1 of Figure 2;

Figure 2 is a plan view taken along the line 2—2 of Figure 1;

Figure 3 is a view similar in character to Figure 1, showing a side elevation of a modified form of weedless guard and fish lure aperture, the view being taken on line 3—3 of Figure 4;

Figure 4 is a view similar to Figure 2, illustrating a plan view of the modified guard and fish lure taken along line 4—4 of Figure 3;

Figure 5 is a section taken along line 5—5 of Figure 3;

Figure 6 is an elevation similar in character to Figures 1 and 3, and showing a further modified form of guard and novel guard adapter attached to a modified fish lure device; the view being taken along line 6—6 of Figure 7;

Figure 7 is the plan view of the modified guard, novel guard adapter and fish lure, taken along line 7—7 of Figure 6;

Figure 8 illustrates a further modified form of guard device, having a novel circular base member adapted to the fish lure; a view is taken on line 8—8 of Figure 9;

Figure 9 is a view taken along line 9—9 of Figure 8, illustrating the features of the further modified form of guard device;

Figure 10 is a front elevation showing the modified guard device illustrated in Figure 8. The view is being taken on line 10—10 of Figure 8.

Referring now more particularly to Figures 1 and 2, I have illustrated a fish lure body 1, having the usual rounded nose or front and body tapering toward the tail part to which hook 2 is suitably secured as by screw 2B. Body 1 is preferably provided at its front end with an angularly disposed mounting surface to which guide bracket 9 is secured as by screws 10. Guide bracket 9 is made of relatively thin gauge material, having a width substantially the same as the front part of the fish lure body 1, and is rounded at the front end 13. The guide bracket is further provided with elongated slot 11 beginning at the midsection and continuing to a close proximity of the front end 13, leaving a narrow retaining section to keep the guard member 7 from coming out of the slot, and also providing a guide way for the same. Elongated slot 11 has suitable width to allow free motion for guard member 7.

The guard means is composed of fish line attaching bar having eye 5 at its extremity, fulcrum loop 6 operatingly disposed in eye bolt 12 which is suitably attached to body 1, guide bar 7 continuing from loop 6 and forming an angular configuration with curved deflecting arm 4. The curved arm 4, having curvature indicated by "R", is suitably looped around the top bar at 8 and is preferably soldered or welded.

A common spring wire guard 3 for hook 2 may be attached to body 1 in the usual manner, as shown in Figure 1.

In use, the fishing line is securely attached in eye 5, and the fish lure device is cast in the water by the fisherman. If weeds are encountered when the lure is drawn or pulled in the direction of the arrow (Figure 1), the semi-circular front part 13 of guide bracket 9 deflects the weeds that may come in contact with it at the sides, and at the lower side curved guard arm 4 is effective in keeping the weeds away from the bottom part of the fish lure or bait. Assuming that a fish is caught on hook 2, it is evident that the fish may swim in a direction different from the pull exerted by the fisherman on the line, and accordingly the guard may swing in the several positions within the possible angles of motion indicated by 14 and 15; however, in any position of the fish lure, the guard members 4 and 7, as well as guide bracket 9 will offer a smooth and rounded contour and surface to which no weeds will attach. In case the fish swims into a weeded submarine patch and carries the lure or bait with it, the lure or bait can be readily withdrawn, together with the fish caught as the guard will separate the weeds and will also be deflected from other obstacles in the water.

In Figures 3 to 5 inclusive, I have illustrated a modified form of guard and fish lure device. In this case, body 20 is provided with the usual hook 21, mounting screw 21B and spring hook guard 21A. At the forward end of body 20 a centrally located aperture 22 is provided wherein guard pivot member 23A is operatingly disposed. Aperture 22 is preferably extended far enough into body 20 so as to allow free reciprocating movement for guard pivot member 23A. Retaining clip 31 is provided for maintaining the pivot member 23A in aperture 22. The guard is a unit by itself and is composed of fish line attaching bar 23 having eye 29 at its extremity, looped end 28, angular pivot member 23A continuing therefrom and radial deflecting members 24, forming substantially a spherical segment. Curved members 24 are soldered or welded into bars 23 and 23A at points 25 and 26. The guard unit is operatingly attached to body 20 by a suitably threaded eye-bolt 27.

It will be readily apparent that pivot member 23A in aperture 22 will at all times act as a fulcrum center about which members 23 and 24 will turn in directions indicated by arrows in Figures 3 and 4. Thus in all possible positions of the guard unit, smooth rounded curve sections are offered to the weeds when the lure is drawn through water in the direction of the arrow in Figure 3.

Referring now more particularly to Figures 6 and 7, I have illustrated another modified form of weedless guard for fish lures and baits. In this case the fish lure body 40 is mounted with the usual hook 41 and attaching screw 41A, and guard 41B. At the front end of body 40 swivel or link 42 is operatingly disposed in cross-slot 43. Link plate 42 is preferably a flat sheet metal plate substantially the same width as the front end of body 40, and is swivelled about fulcrum screw 44.

At the outwardly extending end link plate 42 is provided with guide slots 42A and holes 48 into which guide bar 47 is operatively connected as by means of eye 46A. The ends of link plate 42 are semi-circular and may be downwardly projected immediately at the front end of body 40. A plurality of guide slots 42A is adapted to retain guard-guide members 45A and allow these members to oscillate in directions indicated by curved arrows in Figure 6. The guard unit is composed of singular drawbar 47 having suitable loop 46 for attaching to the fish line, and eye 46A for attaching it to link plate 42. A plurality of U-shaped deflecting members 45A are disposed in guide slots 42A and continue forward, forming deflecting members 45 which are substantially V-shaped and are soldered or welded to bar 47 at points 49. In use, the motion derived from the swivel mounting of link plate 42 is indicated by curved arrows in Figure 7, this motion being supplementary to the oscillating movement of the guard unit fulcrumed in holes 48, will further prevent the weeds from being caught in the fish lure, and will also offer smooth rounded surfaces to the obstacles in the fishing waters when pulled in the direction of arrow indicated in Figure 6.

Referring now more paricularly to Figures 8 to 10, inclusive I have illustrated a further modified form of fish lure guard embodying the salient features of the present invention. The fish lure body 50 is similar in character to body 20 illustrated in Figure 3, and is provided with a conventional hook 51, and guard 51B. At the forward top end of body 50, eye-bolt 52 is suitably attached as by thread 62. The guard unit is composed of ring member 58 operatingly disposed in eye-bolt 52, a single drawbar 53, having looped end 52 also operatingly disposed in eye-bolt 52. A plurality of deflecting members 54 and 55 having preferably curvilinear surfaces are soldered or welded to ring member 58 at points 56 and 57, and to drawbar 53 at a common point 60. The deflecting members 54 and 55 form substantially a dual V-shaped configuration from point 60 onto ring member 58. Drawbar 53 is provided with eye 61 for attaching to the fish line.

In normal condition, the fish lure device is pulled in direction of the arrow indicated in Figure 8, and the curvilinear surfaces of the guard unit are singularly effective to prevent the weeds from being caught on the fish lure. The position of eye-bolt 52 will tend to maintain the front end of the lure within ring 58 and at the same time allow the lure itself free movement. However, if the line is jerked quickly by the fisherman, the offset mounting of eye-bolt 52 will occasion a difference in the resulting forces acting upon the front end of the fish lure device and a peculiar action will develop which will resemble the sideway movement of a fish swimming in water.

While I have disclosed several preferred embodiments of my invention, it will be understood that I do not wish to be limited thereto. As will be apparent to those skilled in the art, certain changes other than those above noted may be made therein without departing from the essence of the invention or the spirit and scope of the appended claims.

What I claim and desire to secure by Letters Patent is:

1. A device of the kind described comprising a fish lure provided with a slot extending substantially longitudinally with respect to said lure, and a weed guard pivoted to said lure, said weed guard having a portion extending through and movable in said slot, a second portion to which a fish line may be secured, and a third portion extending between the first two mentioned portions and disposed in front of said lure when said lure is drawn through water by said fish line.

2. A device of the kind described comprising a fish lure provided with a slot extending substantially longitudinally with respect to said lure, and a weed guard pivoted to said lure, said weed guard having a portion disposed in said slot which limits displacement of the weed guard relative to the lure, a second portion to which a fish line may be secured, and a third portion extending between the first two mentioned portions and disposed in front of said lure when said lure is drawn through water by said fish line.

3. A device of the kind described comprising a fish lure provided with a slot extending substantially longitudinally with respect to said lure, and a weed guard pivoted to said lure, said weed guard having a portion movable in said slot which limits displacement of the weed guard relative to the lure, and another portion extending in front of said lure when said lure is drawn through water by a fish line.

4. A device of the kind described comprising a fish lure provided with a slot extending substantially longitudinally with respect to said lure, and a weed guard pivoted to said lure, said weed guard comprising a piece of wire movable in said slot which limits displacement of said guard relative to said lure, a second piece of wire to which a fish line may be secured, and a third piece of wire secured to the first two mentioned pieces of wire and disposed in front of said lure when said lure is drawn through water by said fish line.

5. A device of the kind described comprising a fish lure, and a weed guard pivoted to said lure, said weed guard having a portion engageable with said lure to limit displacement of said guard relative to said lure, a second portion to which a fish line may be secured, and a third portion extending between the first two mentioned portions and disposed in front of said lure when said lure is drawn through water by said fish line.

6. A device of the kind described comprising a fish lure and a weed guard connected thereto and swingable with respect thereto in two directions at right angles to each other, said lure having means thereon limiting the movement of said guard in one of said directions, said guard having a portion to which a fish line may be secured, a second portion meeting with and angularly disposed with respect to said first named portion, and a third portion extending between said portions at a distance from their meeting point and from their connection to the lure and disposed in front of said lure when said lure is drawn through water by said fish line.

7. A device of the kind described comprising a fish lure and a weed guard connected thereto and swingable with respect thereto in two directions at right angles to each other, said lure having means thereon limiting the movement of said guard in one of said directions, said guard having a portion to which a fish line may be secured, a second portion meeting with and angularly disposed with respect to said first named portion, and a third portion extending between said portions at a distance from their meeting point and from their connection to the lure and disposed in front of said lure when said lure is drawn through water by said fish line, said third portion comprising a wire loop.

8. A device of the kind described comprising a fish lure and a weed guard connected thereto and swingable with respect thereto in two directions at right angles to each other, said lure having means thereon limiting the movement of said guard in one of said directions, said guard having a portion to which a fish line may be secured, a second portion meeting with and angularly disposed with respect to said first named portion, and a third portion extending between said portions at a distance from their meeting point and from their connection to the lure and disposed in front of said lure when said lure is drawn through water by said fish line, said guard being swingably secured to said lure where said first portion and said second portion meet.

9. A device of the kind described comprising a fish lure and a weed guard connected thereto and swingable with respect thereto in two directions at right angles to each other, said lure having means thereon limiting the movement of said guard in one of said directions, said guard having a portion swingably secured to said lure and having a free end to which a fish line may be secured, a second portion meeting with and angularly disposed with respect to said first named portion, and a third portion extending between said portions at a distance from their meeting point and from their connection to the lure and disposed in front of said lure when said lure is drawn through water by said fish line.

OTAKAR VALASEK.